US011048555B2

(12) United States Patent
Cui et al.

(10) Patent No.: US 11,048,555 B2
(45) Date of Patent: Jun. 29, 2021

(54) METHOD, APPARATUS, AND COMPUTER PROGRAM PRODUCT FOR OPTIMIZING EXECUTION OF COMMANDS IN A DISTRIBUTED SYSTEM

(71) Applicant: EMC IP Holding Company LLC, Hopkinton, MA (US)

(72) Inventors: Wei Cui, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 214 days.

(21) Appl. No.: 16/384,353

(22) Filed: Apr. 15, 2019

(65) Prior Publication Data

US 2019/0324817 A1   Oct. 24, 2019

(30) Foreign Application Priority Data

Apr. 20, 2018   (CN) .......................... 201810362333.7

(51) Int. Cl.
```
G06F 9/46      (2006.01)
G06F 9/50      (2006.01)
H04L 29/08     (2006.01)
G06F 9/54      (2006.01)
H04L 29/06     (2006.01)
G06T 1/20      (2006.01)
```
(52) U.S. Cl.
CPC .......... *G06F 9/5038* (2013.01); *G06F 9/505* (2013.01); *G06F 9/547* (2013.01); *H04L 67/32* (2013.01); *H04L 67/40* (2013.01); *G06T 1/20* (2013.01)

(58) Field of Classification Search
CPC ........ G06F 9/5038; G06F 9/505; G06F 9/547; H04L 67/32; H04L 67/40; G06T 1/20
See application file for complete search history.

(56) References Cited

U.S. PATENT DOCUMENTS

| | | | |
|---|---|---|---|
| 8,860,741 B1 * | 10/2014 | Juffa ................... | G06F 12/0831 345/557 |
| 9,576,332 B1 * | 2/2017 | Streete ....................... | G06T 1/20 |
| 2009/0189891 A1 * | 7/2009 | Rivera .................. | G06T 15/005 345/419 |
| 2012/0081373 A1 * | 4/2012 | Li ........................... | G06F 1/329 345/520 |

\* cited by examiner

*Primary Examiner* — Wissam Rashid
(74) *Attorney, Agent, or Firm* — Ryan, Mason & Lewis, LLP

(57) ABSTRACT

According to one example embodiment of the present disclosure, there is provided a method for optimization in a distributed system, where the distributed system comprises a client and multiple hosts among which a host comprises a computing node. The method comprises: receiving a first command requesting to use the computing node from an application at the client; determining the type of the first command; and adjusting the first command on the basis of the type of the first command to optimize the execution of the first command in the distributed system, where the computing node is a graphics processing unit, and the first command is a remote procedure call of the graphics processing unit.

20 Claims, 11 Drawing Sheets

METHOD, APPARATUS, AND COMPUTER PROGRAM PRODUCT FOR OPTIMIZING EXECUTION OF COMMANDS IN A DISTRIBUTED SYSTEM

RELATED APPLICATION(S)

The present application claims priority to Chinese Patent Application No. 201810362333.7, filed Apr. 20, 2018, and entitled "Method, Apparatus, and Computer Program Product for Optimization in Distributed System," which is incorporated by reference herein in its entirety.

FIELD

Embodiments of the present disclosure generally relate to a distributed system, and more specifically, to a method, an apparatus and a computer program product for optimization in a distributed system.

BACKGROUND

Applications on a client device can be designed to complete various processing or analyzing tasks using computing resources, such as processing and storage resources. As the requirement and complexity of the tasks such as machine learning, deep learning, and data mining continuously grow, it requires a large amount of and/or variable computing resources to satisfy operations of the corresponding application. This can be fulfilled by a machine or system having multiple dedicated processing resources, where the application can be scheduled to operate on one or more dedicated processing resources of the machine or system. For example, a cloud-based computing system has already been developed, and such a computing system comprises a machine having one or more dedicated processing resources. Different clients can rent computing resources (for example, dedicated processing resources) of the system as required to operate their own applications.

With the development of new computer technologies, there is an increasing variety of compute nodes, which are no longer limited to traditional ones like central processing units (CPUs). For example, the computing capacity of graphics processing units (GPUs) continues to grow. GPUs are particularly suitable to execute computing tasks such as in deep learning, high performance computing, machine learning by virtue of their distinctive properties. However, for ordinary client devices and conventional cloud computing devices, their GPUs are rather limited in performance and lack high-performance processing capacity. Currently, the question of how to process a computing task using the computing capacity of a GPU of another device (i.e., remotely) in a distributed system has become a focus of research.

However, the application usually needs to remotely call multiple computing nodes in a resource pool of a distributed system based on a network. Since the network might have various potential failures, this might cause latency to the interaction of the application and computing nodes and further makes the application operate inefficiently. Therefore, it is desirable to provide a technical solution for optimization in a distributed system in an easy and effective way.

SUMMARY

Embodiments of the present disclosure provide a method, apparatus and corresponding computer program product for optimization in a distributed system.

According to a first aspect of the present disclosure, there is provided a method for optimization in a distributed system. The distributed system comprises a client and multiple hosts among which a host comprises a computing node. The method comprises: receiving a first command requesting to use the computing node from an application at the client; determining the type of the first command; and adjusting the first command on the basis of the type of the first command to optimize the execution of the first command in the distributed system, where the computing node is a graphics processing unit, and the first command is a remote procedure call (PRC) of the graphics processing unit.

According to a second aspect of the present disclosure, there is provided an apparatus for optimization in a distributed system, the distributed system comprising a client and multiple hosts among which a host comprises a computing node. The apparatus comprises: at least one processor; a volatile memory; and a memory coupled to the at least one processor, the memory having instructions stored thereon, the instructions, when executed by the at least one processor, causing the apparatus to perform acts. The actions comprise: receiving a first command requesting to use the computing node from an application at the client; determining the type of the first command; and adjusting the first command on the basis of the type of the first command to optimize the execution of the first command in the distributed system, wherein the computing node is a graphics processing unit, and the first command is a remote procedure call of the graphics processing unit.

According to a third aspect of the present disclosure, there is provided a computer program product. The computer program product is tangibly stored on a computer readable medium and comprises machine executable instructions which, when executed, cause the machine to implement a method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION

The preferred embodiments of the present disclosure will be described in more detail with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "comprises" and its variants are to be read as open-ended terms that mean "comprises, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can comprise other explicit and implicit definitions.

As described above, computing nodes can be provided locally at the client or by a remote machine or system. In some examples, a cloud-based computing system may be deployed, which comprises a plurality of machines having one or more computing nodes. The computing nodes of the computing system can be utilized by different clients based on their needs to dispatch the corresponding applications to operate on available computing nodes.

Figure 1:
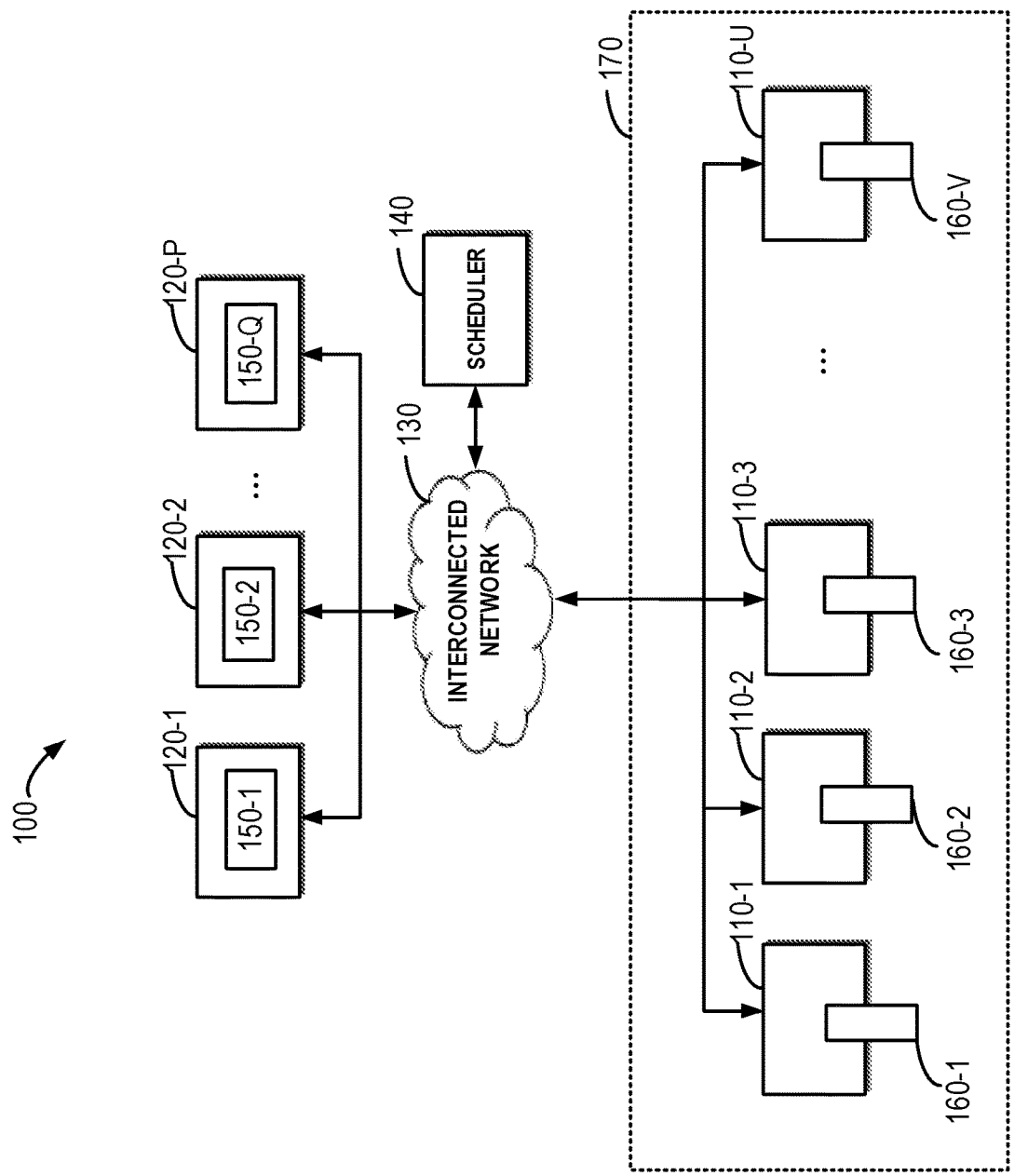
FIG. 1 schematically shows a block diagram of an example distributed system in which some embodiments of the present disclosure can be implemented.

FIG. 1 is a schematic diagram illustrating an example distributed computing system 100 in which embodiments of the present disclosure can be implemented. The computing system 100 may comprise a resource pool 170, and a plurality of hosts for running applications, comprising a host 110-1, a host 110-2, a host 110-3, . . . , a host 110-U (hereinafter collectively referred to as a host 110, wherein U is a natural number greater than 1) deployed in the computing system 100. The computing system 100 further comprises a computing node 160-1, a computing node 160-2, a computing node 160-3, . . . , a computing node 160-V (hereinafter collectively referred to as a computing node 160, wherein V is a natural number greater than 1). Each host 110 has one or more computing nodes 160.

In the example of FIG. 1, the host 110-1 has the computing node 160-1, the host 110-2 has the computing node 160-2, the host 110-3 has the computing node 160-3, and the host 110-U has the computing node 160-V. It will be understood that each host is not limited to have only one computing node, but one host may have one or more computing nodes. Therefore, here the value of U may not equal that of V.

Throughout the context of the present disclosure, examples of the computing node 160 may comprise, but are not limited to, a GPU, a field programmable gate array (FPGA), or the like. For the sake of discussion, some embodiments will use GPU as the example of the dedicated processing resources. In addition to the computing node 160, the host 110 may further comprise, for example, one or more general processing units such as a central processing unit (CPU) (not shown).

FIG. 1 further illustrates a plurality of clients 120-1, 120-2, . . . , 120-P (hereinafter collectively or individually referred to as a client 120, wherein P is a natural number greater than 1) respectively having applications 150-1, 150-2, . . . , 150-Q (hereinafter collectively referred to as an application 150, wherein Q is a natural number greater than 1) to run. The application 150 may be any application running on the machine, and the application can be designed to perform corresponding data processing or analyzing tasks. As an example, the application 150 can perform data processing or analyzing tasks associated with neural networks. It will be appreciated that each client is not limited to have only one application, but one client may have one or more applications. Therefore, here the value of P may not equal that of Q.

To quickly and efficiently run these applications and/or save local computing resources, the client 120 may request the computing node 160 of the host 110 to run these applications 150. In such an embodiment, the client 120 may be connected via an interconnected network 130 to one or more hosts 110 and hand over the application 150 to be run by one or more computing nodes 160 of the host 110. The interconnected network 130 can support different types of wired or wireless connections based on various network transmission techniques, for example, remote direct memory access (RDMA), transmission control protocol (TCP), or the like, depending on interfaces supported by the client 120, the host 110 and/or the computing node 160.

It should be understood that the device and/or arrangement as shown in FIG. 1 is provided as an example only. In other examples, the distributed computing system 100 can comprise any suitable number of hosts 110 and clients 120. Each host 110 can have any suitable number of computing nodes 160, and each client 120 can have a plurality of applications 150 to run. In addition, a scheduler 140, although separately shown, can be implemented by other devices independent of the host 110 in a practical application, or can be implemented partially or entirely on one or more hosts 110.

To provide description in a clear and concise manner, example embodiments of the present disclosure will be described in detail by mainly using the GPU kernel as an example. However, it should be understood that the GPU is only an example computing node and shall not limit the scope of the present disclosure. Spirits and principles described herein can be applied to other computing nodes, for example, computing nodes in an accelerator such as an FPGA currently known or to be developed in the future, without being limited to the GPU kernel only.

Figure 2:
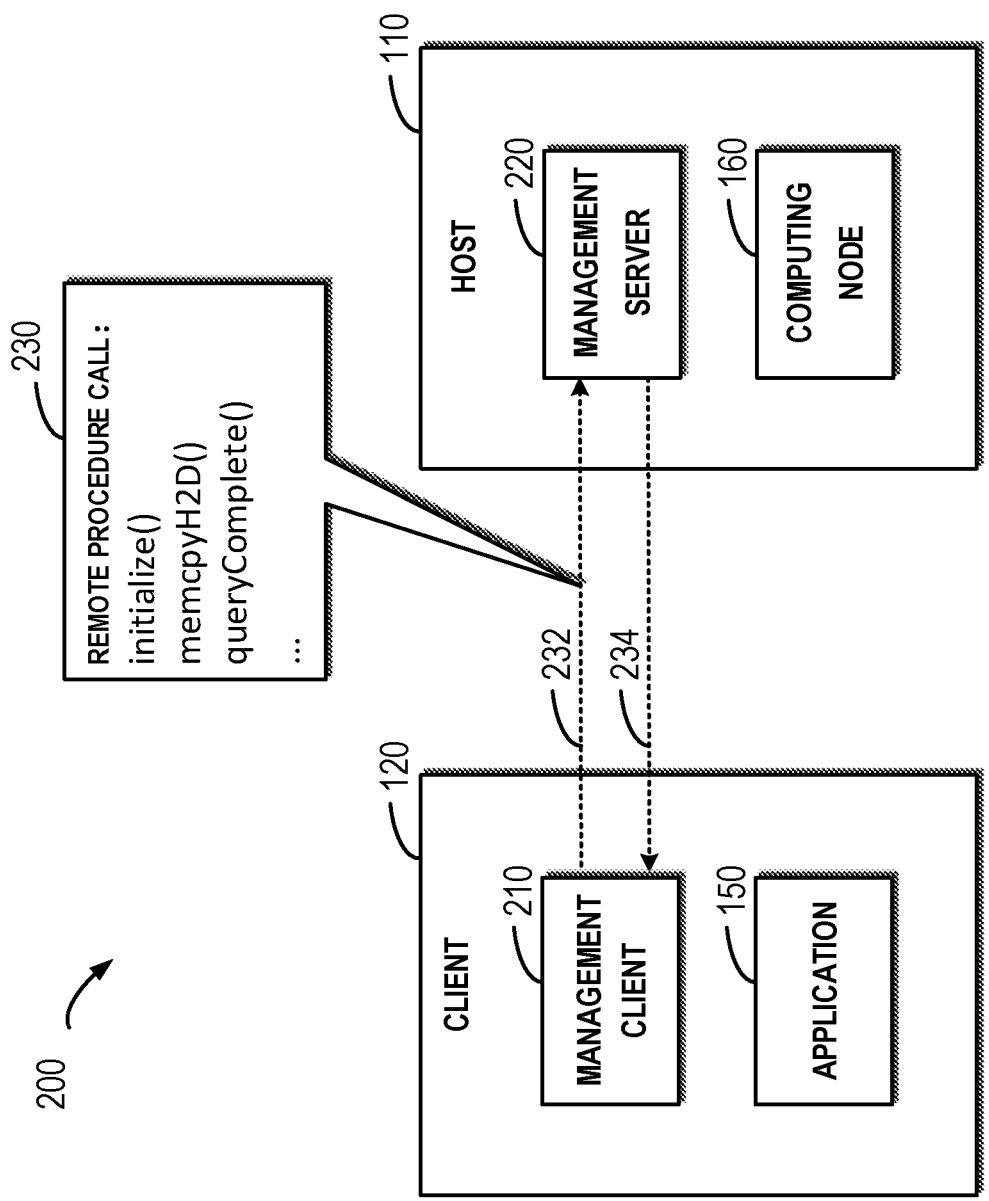
FIG. 2 schematically shows a block diagram for executing a command in a distributed system according to one technical solution.

FIG. 2 schematically shows a block diagram 200 for executing commands in the distributed system 100 according to one technical solution. It will be understood that FIG. 2 only shows the interaction between one client 120 and one host 110. In other embodiments, the interaction between more clients 120 and more hosts 110 may further be involved. As shown in FIG. 2, the client 120 comprises a management client 210 for parsing a command from the application 150 at the client 120 and forwarding the same to a management server 220 at the host 110. According to one example embodiment of the present disclosure, the management client 210 may be implemented on the basis of a client-side library. Here, the management server 220 may reside on the host 110 and is for receiving data from the management client 210 (as shown by an arrow 232) and returning a processing result to the management client 210 (as shown by an arrow 234). Here, the management server 220 may be implemented by, for example, a server-side daemon.

It will be understood that since the interaction as shown by the arrows 232 and 234 is transmitted via a network the interconnected network 130 as shown in FIG. 1) and the interconnected network 130 might not always be in stable state, latency or other failure will occur to the communication between the client 120 and the host 110 in some circumstances. At this point, latency will occur when various commands as shown by remote procedure calls 230 are transmitting from the client 120 to the host 110, and an execution result from the host 110 will also have latency. In view of the foregoing problems, it is desirable to provide a technical solution for optimizing the distributed system 100. It is desired that the technical solution may quickly and efficiently assist the application 150 at the client 120 in calling the computing node 160 of the host 110 in the resource pool 170 without changing the hardware configuration of the distributed system 100 as much as possible.

Figure 3:
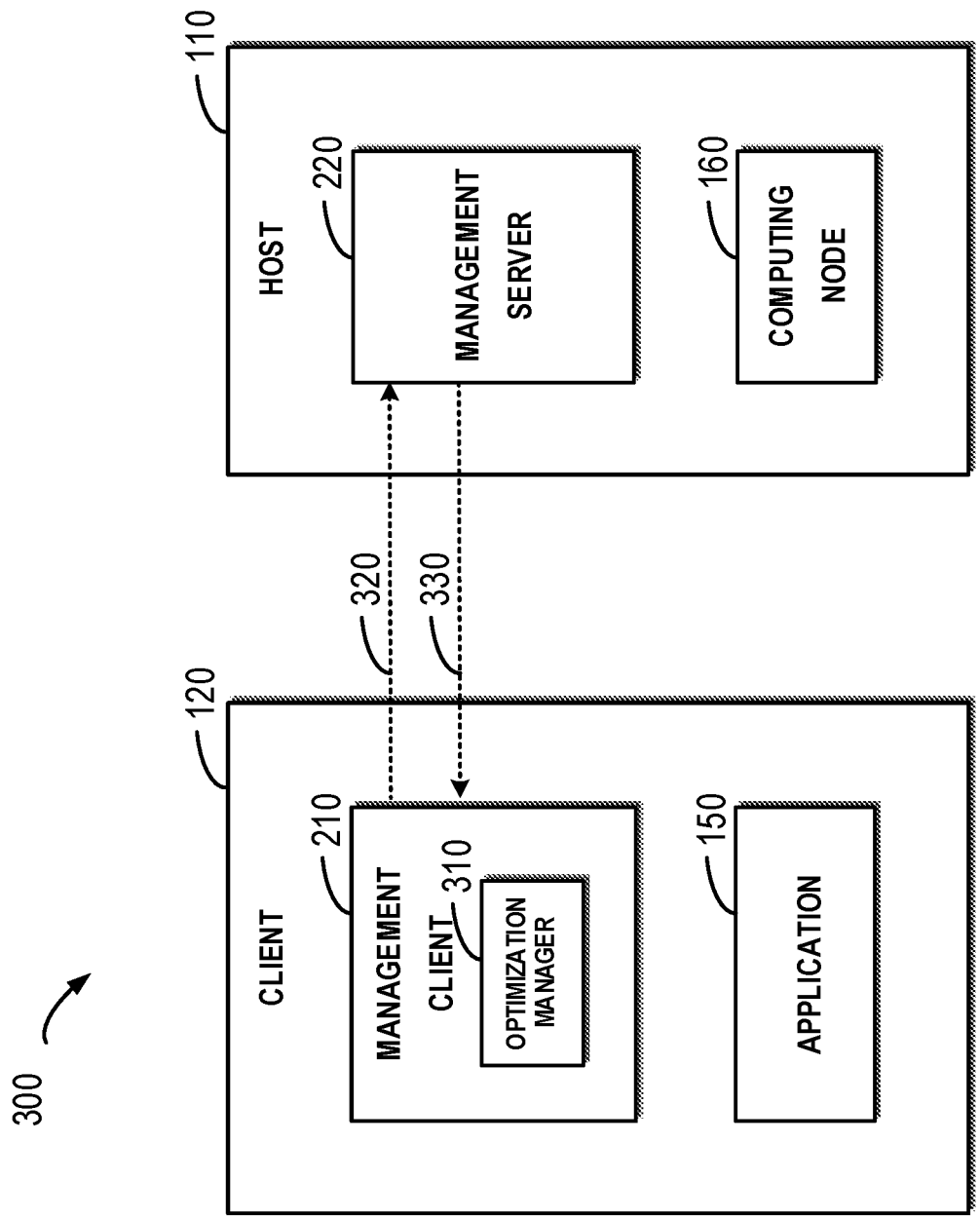
FIG. 3 schematically shows a block diagram of a solution for optimization in a distributed system according to one example embodiment of the present disclosure.

FIG. 3 schematically shows a block diagram 300 of a solution for optimization in the distributed system 100 according to one example embodiment of the present disclosure. As depicted, according to one example embodiment of the present disclosure, the management client 210 may be provided with an optimization manager 310, which may execute a corresponding optimization operation on the basis of the type of a command from the application 150. It will be understood that although the optimization manager 310 is deployed at the client 120 as shown in FIG. 3, in other embodiments, the optimization manager 310 may be deployed at another place, so long as the optimization manager 310 can receive a command from the application 150 and execute a corresponding optimization operation on the basis of the type of the command.

According to one example embodiment of the present disclosure, there is provided a method for optimization in the distributed system 100. The distributed system 100 comprises the client 120 and multiple hosts, among which the host 110 comprises the computing node 160. First of all, a first command requesting to use the computing node 160 is received from the application 150 at the client 120. Subsequently, the type of the first command may be determined, and the first command may be adjusted on the basis of its type to optimize the execution of the first command in the distributed system 100. In this embodiment, the computing node 160 is a GPU, and the first command is a remote procedure call of the GPU.

In this embodiment, the optimization manager 310 may adjust the first command on the basis of the type of the first command. For example, the interaction between the client 120 and the host 110 (as shown by the arrows 320 and 330) may be reduced as much as possible. Alternatively and/or additionally, operations associated with the first command and/or further commands to be received later may be deployed at the client 120 or the host 110 for execution, so as to reduce the latency caused by potential failures in the interconnected network 130.

Figure 4:
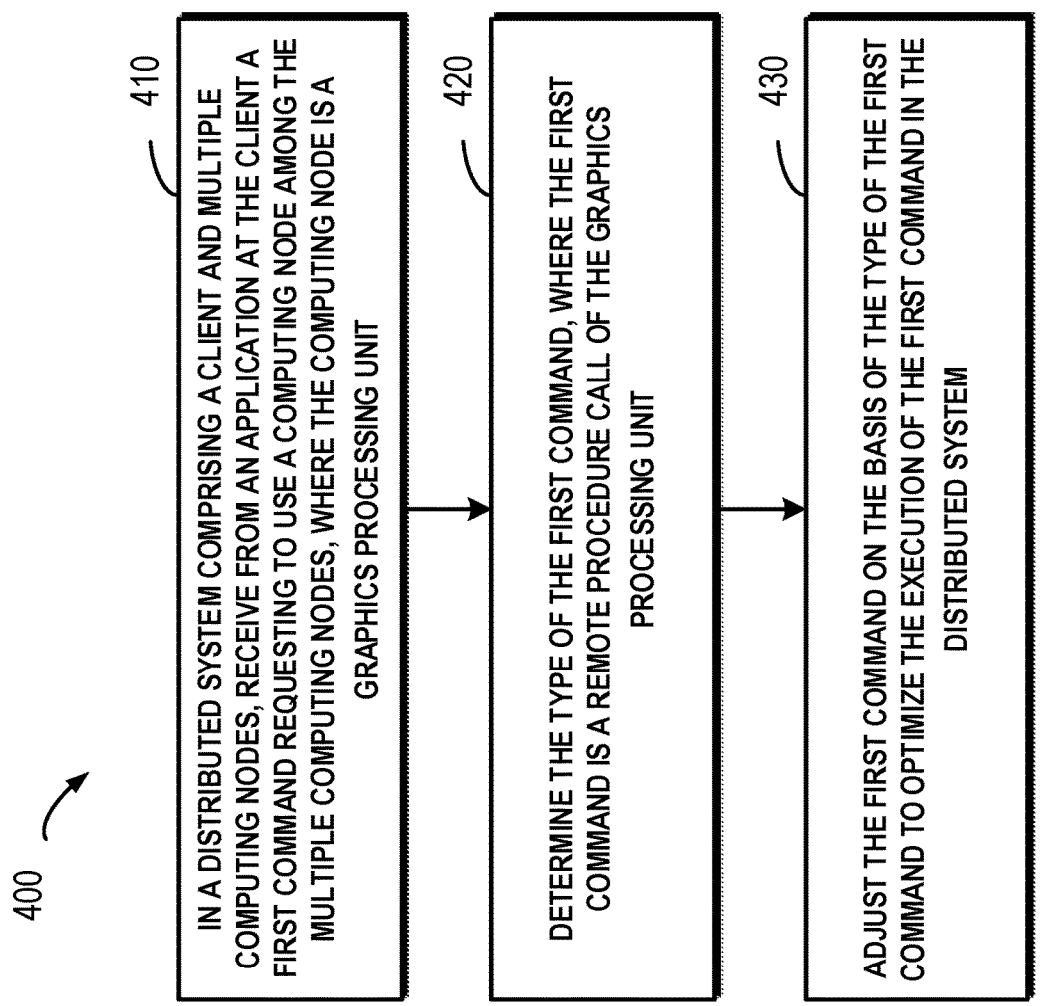
FIG. 4 schematically shows a flowchart of a method for optimization in a distributed system according to one example embodiment of the present disclosure.

With reference to FIG. 4, further details about optimization are presented below. FIG. 4 schematically shows a flowchart of a method 400 for optimization in the distributed system 100 according to one example embodiment of the present disclosure. In a block 410, a first command requesting to use the computing node 160 is received from the application 150 at the client 120. In this embodiment, the computing node 160 is a GPU, and the first command is a remote procedure call of the GPU.

In a block 420, the type of the first command may be determined. Here, the first command may take various types. For example, types of the first command may comprise, but are not limited to, information-query type, handler-create type, copy type, etc. It will be understood that for a different computing node 160, the definition and type of a command supported by the computing node 160 may differ. Throughout the context of the present disclosure, the above three types of commands are taken as examples to describe details about the embodiments of the present disclosure. With the advancement of technologies, more types of commands might arise. Based on the principles described in the present disclosure, those skilled in the art may make adjustments to various types of commands so as to optimize the distributed system 100. In a block 430, the first command may be adjusted on the basis of the type of the first command to optimize the execution of the first command in the distributed system 100. With reference to FIGS. 5 to 8, a detailed description is presented below on how to execute optimization with respect to different types of commands.

First of all, description is illustratively presented with respect to optimization associated with a query type command. Usually, regarding some query commands, their query results will not change during execution of the application 150. Therefore, when the query command is executed for the first time, the query result is saved for subsequent use. If the same query command is received later, then the query command does not have to be forwarded via the interconnected network 130 to the host 110 to obtain a query result, but the saved query result is directly returned to the application 150. As compared with the prior art in which every time a query command is executed, the interaction between the client 120 and the host 110 needs to be made via the interconnected network 130, the foregoing example embodiment may reduce the latency caused by potential failures in the interconnected network 130 and further greatly increase the operation efficiency of the application 150.

According to one example embodiment of the present disclosure, the first command may be sent to the host 110. After the host 110 executes the first command, an execution result of the first command may be received from the host 110. Subsequently at the client 120, the execution result may be returned to the application, and if it is determined that the type of the first command indicates the execution result of the first command is constant during execution of the application 150, then the execution result is stored.

According to one example embodiment of the present disclosure, there may exist multiple query commands whose execution results are constant. For example, the query commands may comprise, but are not limited to:

Query driver version command cuDriverGetVersion( );
Query function-related attribute command cuFuncGetAttribute( );

Query device-related attribute command cuDeviceGetAttribute( );

Alternatively and/or additionally, query commands may further comprise other commands, such as
cuFuncMaxBlockOccupation( );
cudnnGetConvolutionBackwardDataWorkspaceSize( );
cudnnGetConvolutionBackwardFilterWorkspaceSize( );

It will be understood that the commands presented above are merely exemplary. For different distributed systems 100, they may support different query commands.

Figure 5:
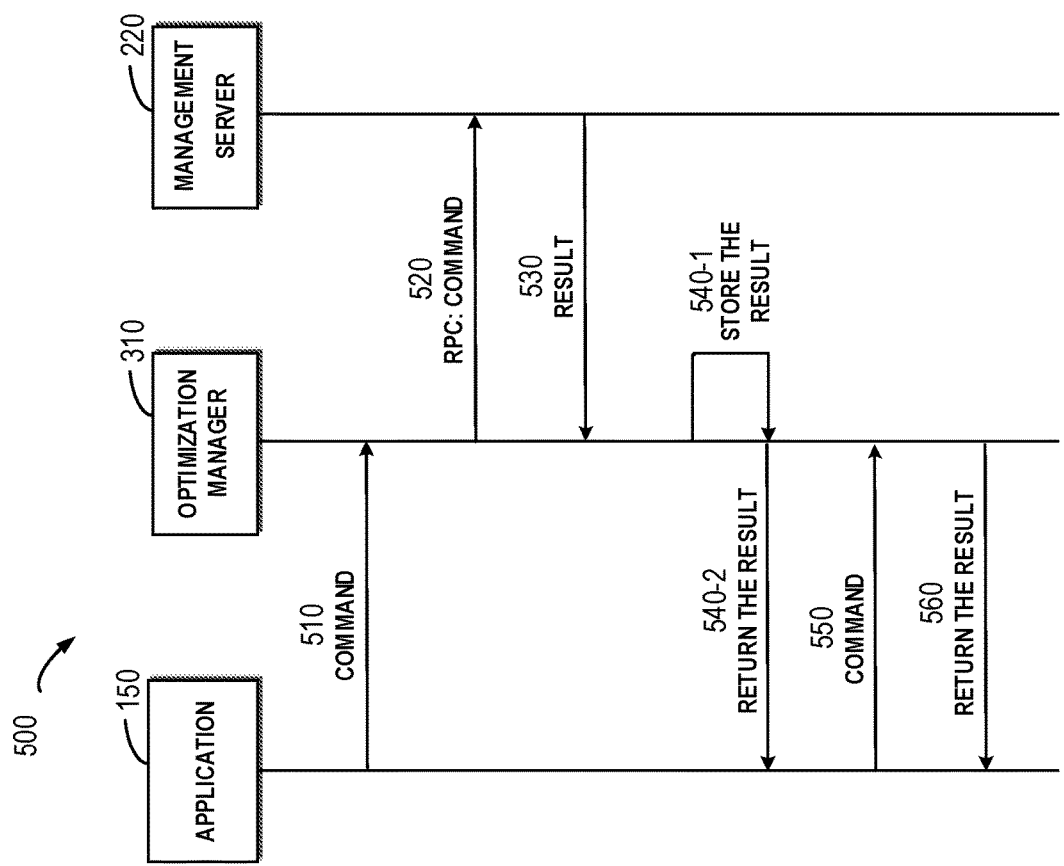
FIG. 5 schematically shows a block diagram of a solution for optimization in a distributed system according to one example embodiment of the present disclosure.

FIG. 5 schematically shows a block diagram 500 of a solution for optimization in a distributed system 100 according to one example embodiment of the present disclosure. The figure shows the interaction between the application 150, the optimization manager 310 and the management server 220. As shown by an arrow 510, a command from the application 150 is received at the optimization manager 310. As shown by an arrow 520, the command may be sent to the management server 220 on the basis of a remote procedure call, so as to be executed by the computing node 160 in the host 110. Next, as shown by an arrow 530, the management server 220 may send an execution result to the optimization manager 310. Subsequently, the result may be stored at the optimization manager 310 (as shown by an arrow 540-1) and then returned to the application 150 (as shown by an arrow 540-2).

With the foregoing example embodiment, only when a command is received for the first time, the command is transmitted via the interconnected network 130. By storing the execution result, when the same command is later received again, the command does not need to be transmitted via the interconnected network 130, nor does the execution result need to be received. With the foregoing example embodiment, the latency caused by potential failures in the interconnected network 130 may be reduced greatly. Still with reference to FIG. 5, if a second command of the same type is received from the application (as shown by an arrow 550), the stored execution result may be returned to the application 150 (as shown by an arrow 560).

Figure 6A:
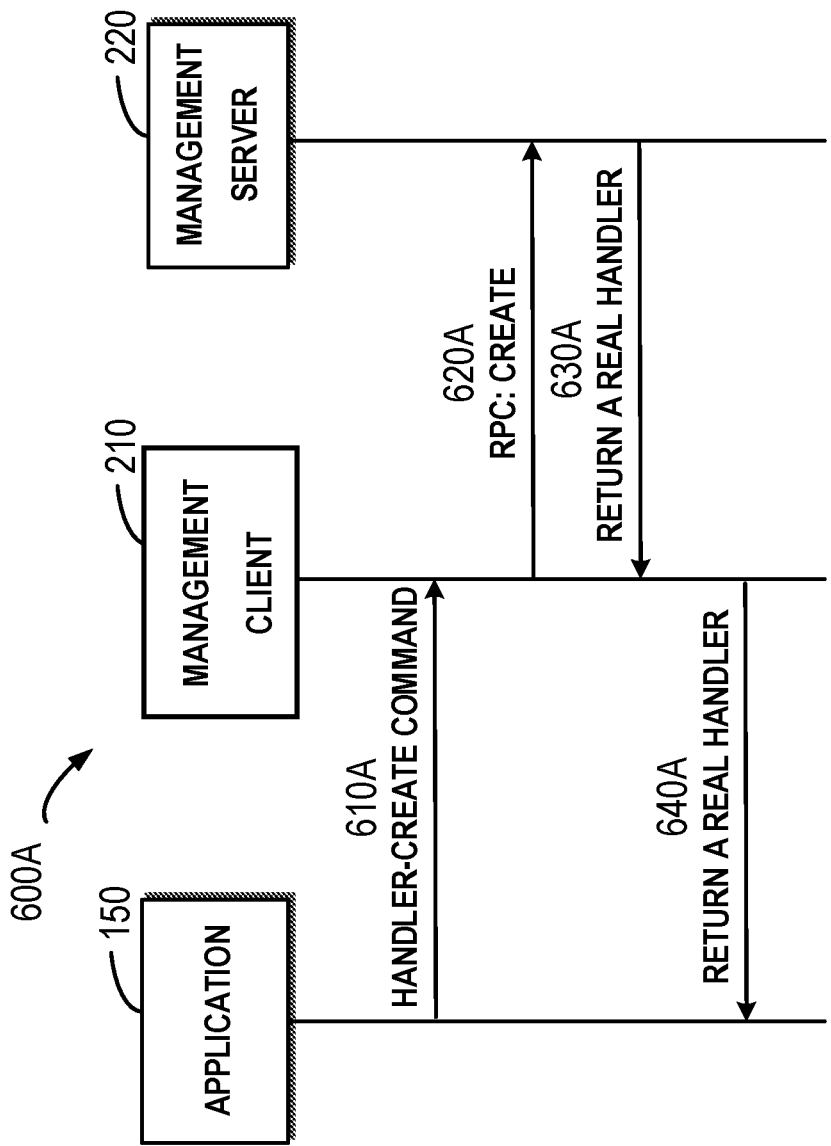
FIG. 6A schematically shows a block diagram of the process for creating a handler in a distributed system according to one solution.
Figure 6B:
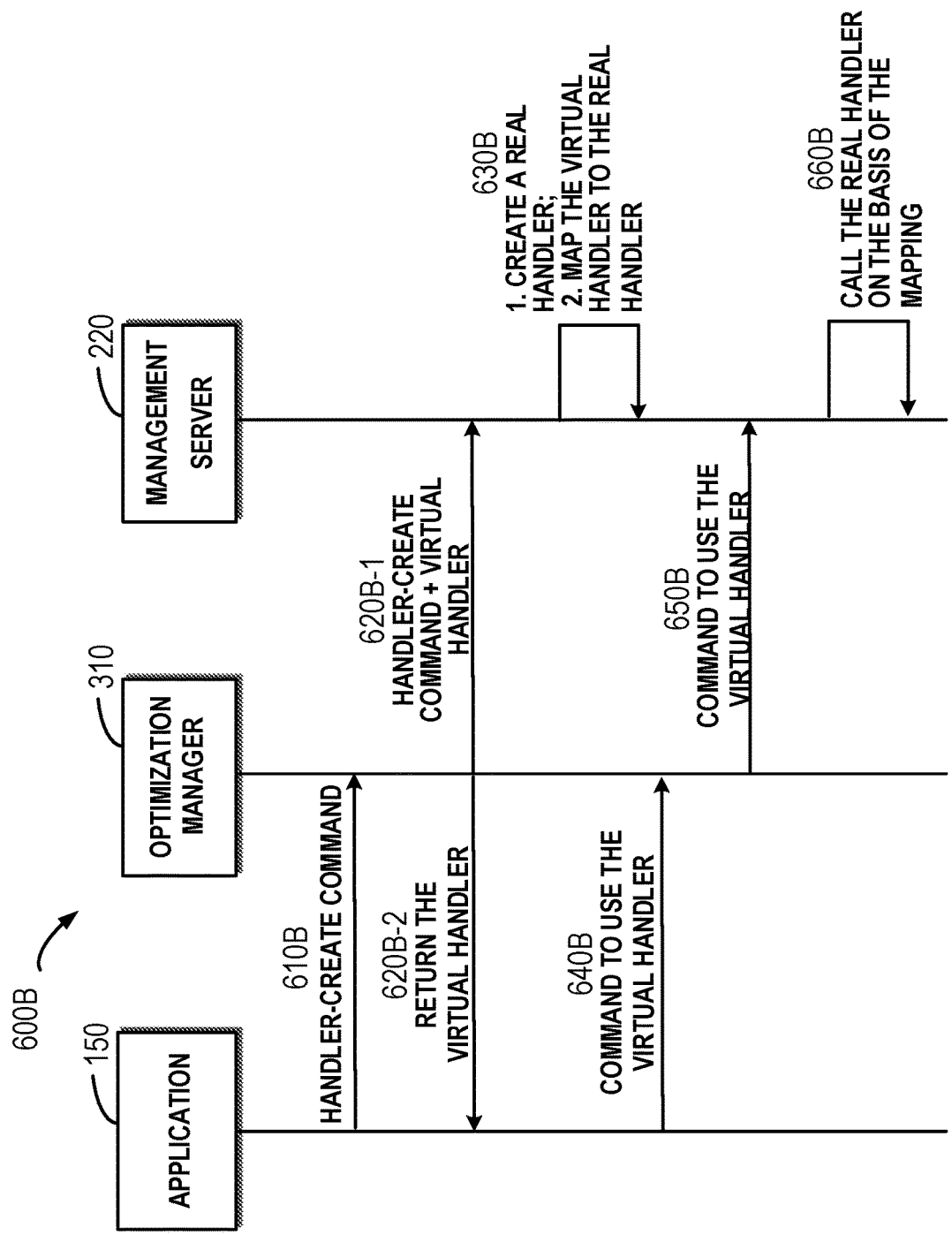
FIG. 6B schematically shows a block diagram for optimization in the process in FIG. 6A according to one example embodiment of the present disclosure.

With reference to FIGS. 6A and 6B, description is presented below with further details about a handler-create type command. FIG. 6A schematically shows a block diagram 600A of the process for creating a handler in the distributed system 100 according to one solution. As shown by an arrow 610A, the management client 210 may receive a handler-create command from the application 150. Then, the management client 210 may, based on a remote procedure call, notify the management server 220 to create a handler (as shown by arrow 620A). The management server 220 creates a real handler and returns the created real handler to the management client 210 (as shown by arrow 630A). Subsequently, the management client 210 returns the created real handler to the application 150 (as shown by arrow 640A). In the block diagram as shown in FIG. 6A, since the interaction shown by arrows 620A and 630A is effected on the basis of the interconnected network 130, it is highly possible that due to the impact of various potential failures in the interconnected network 130, the application 150 has to wait for the real handler to be returned. The latency will deteriorate when the application 150 desires to create multiple handlers.

According to one example embodiment of the present disclosure, there is provided an optimized technical solution for creating a handler. In this embodiment, a command from the application 150 may be served on the basis of a virtual handler, and by establishing a mapping relationship between the virtual handler and the real handler, it is possible to quickly respond to a handler-create command from the application 150. According to one example embodiment of the present disclosure, if it is determined the type of the first command is handler-create type, then a virtual handler created on the basis of the first command may be returned to the application. Next, the host 110 may be notified to create a real handler on the basis of the first command, and the virtual handler is mapped to the real handler.

FIG. 6B schematically shows a block diagram 600B for optimization in the process of FIG. 6A according to one example embodiment of the present disclosure. In FIG. 6B, as shown by an arrow 610B, the optimization manager 310 receives a handler-create command from the application 150. Next, as shown by an arrow 620B-1, a virtual handler may be created at the optimization manager 310, and the created virtual handler may be sent to the management server 220 along with the handler-create command so as to notify the management server 220 to execute a corresponding operation. Further, as shown by an arrow 620B-2, a virtual handler may be sent to the application 150 immediately after being created. As shown by an arrow 630B, the management server 220 may create a real handler and map the virtual handler to the created real handler. In this way, an association may be established between the virtual handler and the real handler, so that when a command to use the virtual handler is later received, the real handler may be directly called on the basis of the mapping relationship to perform a corresponding operation.

According to one example embodiment of the present disclosure, if a second command to operate the virtual handler is received from the application 150, the host 110 may be notified to operate the real handler on the basis of the second command. Still with reference to FIG. 6B, during operation of the application 150, the application 150 may use the virtual handler to call corresponding resources in the computing node 160.

As shown by an arrow 640B, a virtual-handler-use command from the application 150 may be received at the optimization manager 310. Next, as shown by an arrow 650B, the optimization manager 310 may forward the received command to the management server 220 so as to notify the computing node 160 to execute an operation defined in the command on the basis of a real handler corresponding to the virtual handler (as shown by an arrow 660B).

According to one example embodiment of the present disclosure, if an execution result of operating the real handler is received from the management server 220, the execution result may be returned to the application 150 so as to respond to the second command. It will be understood that although FIG. 6B does not show a step of executing a corresponding operation and returning an execution result, the step may be similar to a conventional operation flow and thus is not detailed. With the foregoing example embodiments, the mapping from the virtual handler to the real handler is transparent to the application 150. In this way, a handler-create command from the application 150 may be responded to more quickly, and the latency caused by potential failures in the interconnected network 130 may be reduced.

According to one example embodiment of the present disclosure, if it is determined the type of the first command is data-copy type, and a similar second command to copy data is received subsequently, then at this point how to execute optimization in the distributed system 100 may be determined by comparing the two copy commands.

According to one example embodiment of the present disclosure, if a first command (the first command indicates that target data at a source address in a source device is to be copied to a first destination address in a destination device) is received, then the first command may be executed. If a second command (the second command indicates that target data is to be copied to a second destination address in the destination device) is received subsequently, then at this point the second command may be adjusted by comparing data at the first destination address with the target data).

It will be understood that data copy from the source device to the destination device is rather slow because to-be-copied target data needs to be transmitted via the interconnected network 130. In comparison, data copy within the same device (e.g. the source device or the destination device) is quite fast because data does not need to be transmitted via the interconnected network 130. Based on the principle, if commands to copy data from the same address in the source device to different addresses in the destination device are received one after another, and to-be-copied data has the same length, then the second command for copying data from the source device to the destination device may be converted to a data copy within the destination device.

According to one example embodiment of the present disclosure, whether data at the first destination address is available may be determined depending on whether the data is changed after the first command is executed. If the data at the first destination address is not changed, then the data is available, at which point the second command to copy data between the source device and the destination device may be directly converted to a third command (the third command indicating that the data at the first destination address in the destination device is to be copied to the second destination address in the destination device). By means of the foregoing example embodiment, by converting data copy between different devices to a data copy within the same device, the data copy speed may be increased greatly, the latency in the application 150 caused by potential failures in the interconnected network 130 may be reduced, and further the operation efficiency of the application 150 may be improved.

Figure 7:
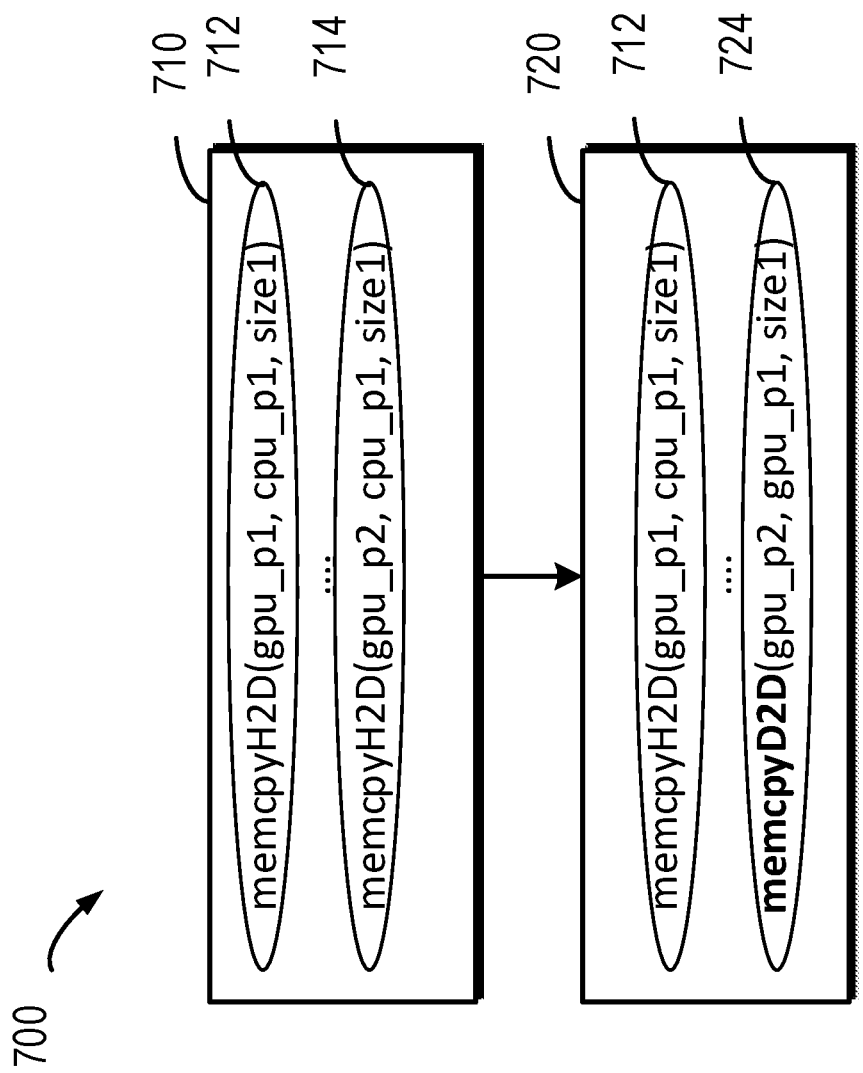
FIG. 7 schematically shows a block diagram for executing a data copy command in a distributed system according to one example embodiment of the present disclosure.
Figure 8:
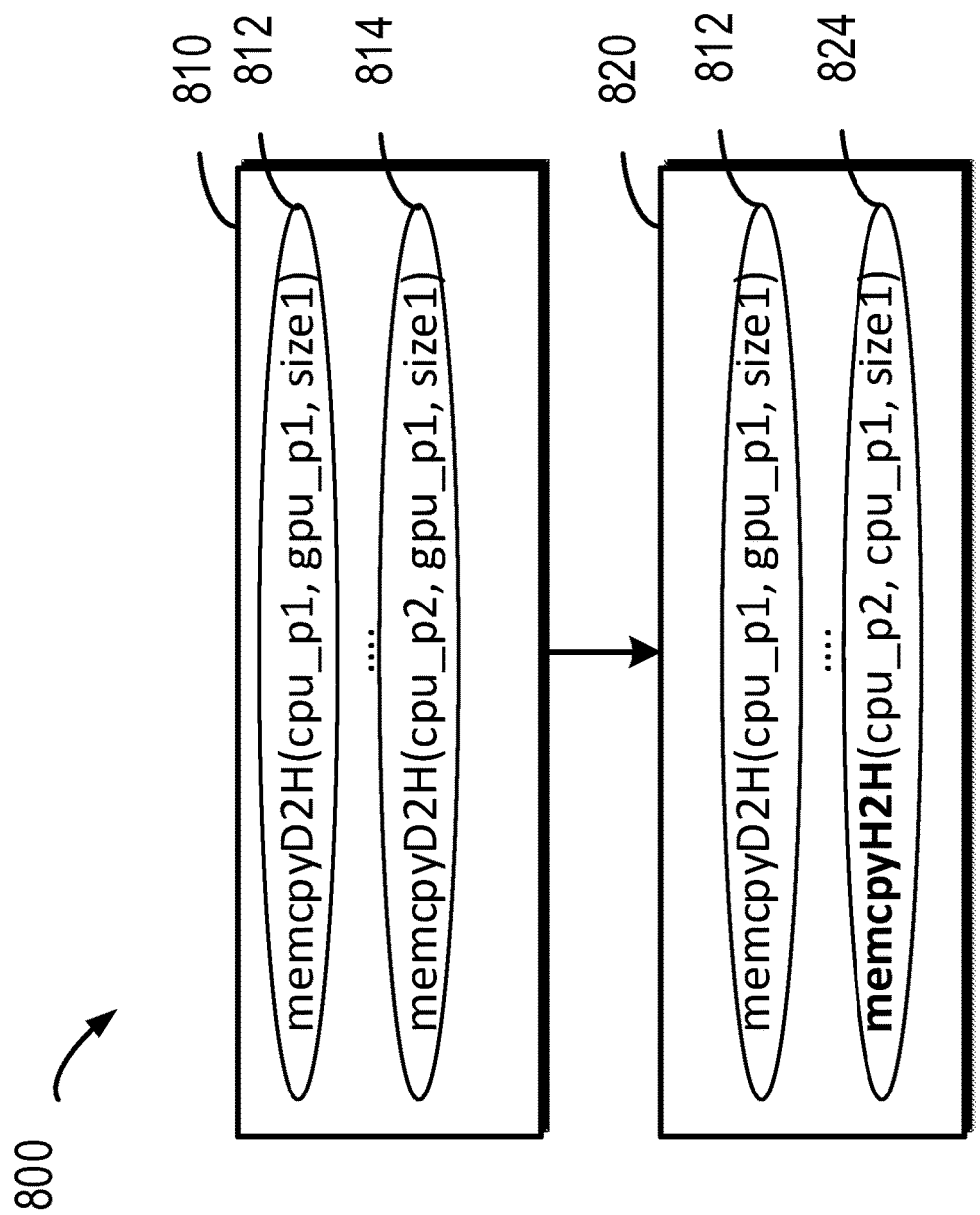
FIG. 8 schematically shows a block diagram for executing a data copy command in a distributed system according to one example embodiment of the present disclosure.

According to one example embodiment of the present disclosure, the source device may be any one of the client 120 and the computing node 160, and the destination device may be the other of the client 120 and the computing node 160. With reference to FIGS. 7 and 8, description is presented to the two cases, respectively.

FIG. 7 schematically shows a block diagram 700 for executing a data copy command in a distributed system according to one example embodiment of the present disclosure. As depicted, memcpyH2D is a command 712 to copy data from the client 120 to the computing node 160. The command 712 indicates that target data having a length of size 1 is to be copied from a source address cpu_p1 in the client 120 to a destination address gpu_p1 in the computing node 160. Similarly, those skilled in the art may understand the meaning of a command 714. A block 710 in FIG. 7 schematically shows two data copy commands 712 and 714 received from the application 150. Both of the two data copy commands 712 and 714 require a to-be-copied target data block to be transmitted via the interconnected network 130, and thus may have the time latency.

According to one example embodiment of the present disclosure, with a period after the execution of the command 712 and before the execution of the command 714, if it is determined that data at the address gpu_p1 is not changed, then the command 714 may be replaced with a command 724 so as to form a command as shown in block 720. memcpyD2D denoted by the reference numeral 724 is a command to execute a data copy within the computing node 160. The command 724 indicates that within the computing node 160, data having a length of size 1 is to be copied from gpu_p1 to a destination address gpu_p2. With the foregoing example embodiment, when a data copy is executed for the second time, to-be-copied target data does not have to be transmitted via the interconnected network 130, but a data copy may be quickly executed within the computing node 160. Therefore, the risk of latency caused by potential failures in the interconnected network 130 may be reduced significantly.

FIG. 8 schematically shows a block diagram 800 for executing a data copy command in the distributed system 100 according to one example embodiment of the present disclosure. The example in FIG. 8 is similar to that in FIG. 7, and the difference is that FIG. 8 shows a circumstance in which a data copy from the computing node 160 to the client 120 is executed. Where data at the address cpu_p1 is not changed after the execution of a command 812 and before the execution of a command 814, at this point the command 814 in a block 810 in FIG. 8 may be replaced by a command 824 in a block 820. The command 824 indicates that within the client 120, data having a length of size1 is to be copied from cpu_p1 to a destination address cpu_p2. Based on the principles similar to those described in FIG. 7, those skilled in the art may understand specific details about the replacement process, which are not repeated here.

Description is presented below on how to determine whether data at the first destination address is modified. Different determination approaches may be adopted depending on different devices to which the first destination address belongs. According to one example embodiment of the present disclosure, the source device is the computing node 160, and the destination device is the client 120. At this point, a first signature of data at the first destination address may be determined after the execution of the first command, and a target signature of the target data may be determined. Next, whether data at the first destination address is changed may be determined depending on whether the first signature matches with the target signature. If the first signature matches with the target signature, then it may be determined that data at the first destination address is not changed after the execution of the first command. Otherwise, it may be determined that data at the first destination address is changed after the execution of the first command.

According to one example embodiment of the present disclosure, the signature of data may be determined on the basis of various approaches that are currently known or to be developed in future. For example, a value of the signature may be determined on the basis of the SHA256 algorithm. Alternatively and/or additionally, the signature may be further determined on the basis of other algorithms.

According to one example embodiment of the present disclosure, the source device is the client 120, and the destination device is the computing node 160. At this point, whether data at the first destination address is changed may be determined by determining whether a data copy command overlapping the scope of the first destination address is received. If a data-copy type command overlapping the first destination address is not received, then it is determined that data at the first destination address is not changed after the execution of the first command.

Figure 9:
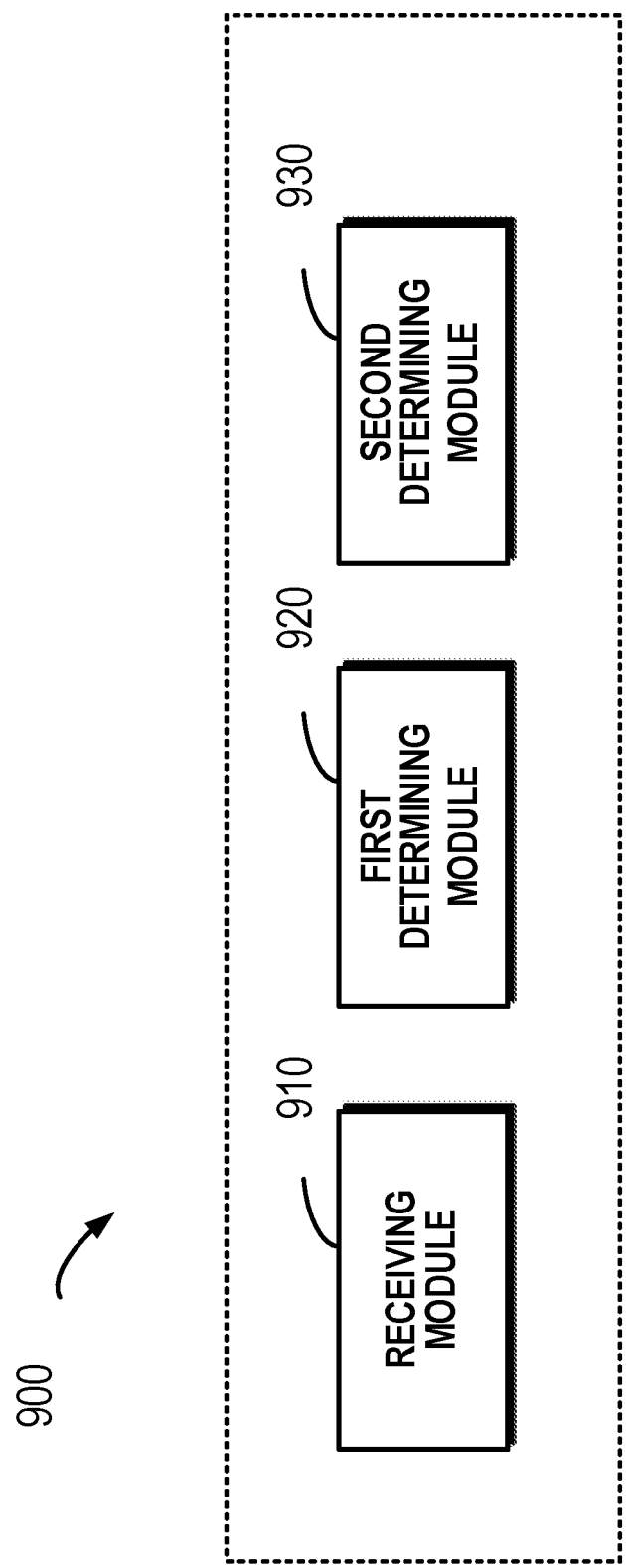
FIG. 9 schematically shows a block diagram of an apparatus for optimization in a distributed system according to one example embodiment of the present disclosure.

While examples of the method according to the present disclosure have been described in detail with reference to FIGS. 2 to 8, an embodiment of a corresponding apparatus will be described in detail with reference to FIG. 9. FIG. 9 schematically shows a block diagram of an apparatus 900 for optimization in a distributed system 100 according to one example embodiment of the present disclosure. The distributed system 100 comprises a client 120 and multiple hosts 110, among which a host 110 comprises a computing node 160. The apparatus 900 comprises: a receiving module 910 configured to receive a first command requesting to use the computing node 160 from an application 150 at the client 120; a first determining module 920 configured to determine the type of the first command; and a second determining module 930 configured to adjust the first command on the basis of the type of the first command to optimize the execution of the first command in the distributed system 100. In this embodiment, the computing node 160 is a GPU, and the first command is a remote procedure call of the GPU. The apparatus 900 here may be configured to execute various steps in the method 400 described above, which is not repeated here again.

Figure 10:
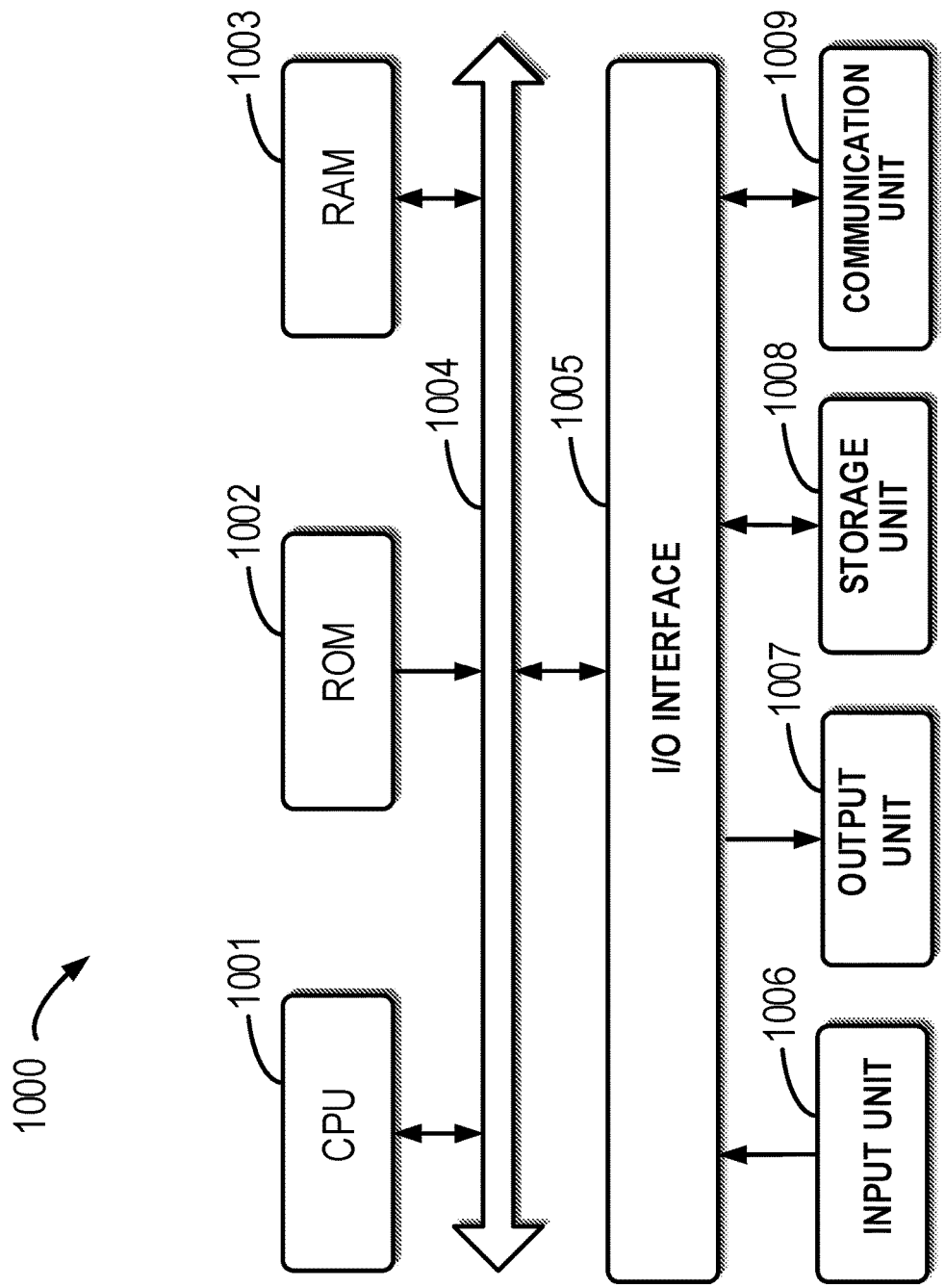
FIG. 10 schematically shows a block diagram of an apparatus for optimization in a distributed system according to one example embodiment of the present disclosure.

FIG. 10 schematically shows a block diagram of an apparatus 1000 for optimization in a distributed system according to one example embodiment of the present disclosure. As depicted, the apparatus 1000 comprises a central process unit (CPU) 1001, which can execute various suitable actions and processing based on the computer program instructions stored in the read-only memory (ROM) 1002 or computer program instructions loaded in the random-access memory (RAM) 1003 from a storage unit 1008. The RAM 1003 can also store all kinds of programs and data required by the operations of the apparatus 1000. CPU 1001, ROM 1002 and RAM 1003 are connected to each other via a bus 1004. The input/output (I/O) interface 1005 is also connected to the bus 1004.

A plurality of components in the apparatus 1000 is connected to the I/O interface 1005, comprising: an input unit 1006, such as keyboard, mouse and the like; an output unit 1007, e.g., various kinds of display and loudspeakers etc.; a storage unit 1008, such as magnetic disk and optical disk etc.; and a communication unit 1009, such as network card, modem, wireless transceiver and the like. The communication unit 1009 allows the apparatus 1000 to exchange information/data with other devices via the computer network, such as Internet, and/or various telecommunication networks.

The above-described process and treatment, such as the method 400, can also be executed by the processing unit 1001. For example, in some embodiments, the method 400 can be implemented as a computer software program tangibly comprised in the machine-readable medium, e.g., the storage unit 1008. In some embodiments, the computer program can be partially or fully loaded and/or mounted to the apparatus 1000 via ROM 1002 and/or the communication unit 1009. When the computer program is loaded to the RAM 1003 and executed by the CPU 1001, one or more steps of the above-described method 400 can be implemented. Alternatively, in other embodiments, the CPU 1001 also can be configured in other suitable manners to realize the above procedure/method.

According to one example embodiment of the present disclosure, there is provided an apparatus for optimization in a distributed system, the distributed system comprising a client and multiple hosts among which a host comprises a computing node. The apparatus comprises: at least one processor; a volatile memory; and a memory coupled to the at least one processor, the memory having instructions stored thereon, the instructions, when executed by the at least one processor, causing the apparatus to perform acts. The acts comprise: receiving a first command requesting to use the computing node from an application at the client; determining the type of the first command; and adjusting the first command on the basis of the type of the first command to optimize the execution of the first command in the distributed system, wherein the computing node is a graphics processing unit, and the first command is a remote procedure call of the graphics processing unit.

According to one example embodiment of the present disclosure, adjusting the first command comprises: in response to determining that the type of the first command indicates an execution result of the first command is constant during execution of the application, sending the first command to the host; receiving an execution result of the first command from the host; and returning the execution result to the application and storing the execution result.

According to one example embodiment of the present disclosure, the acts further comprise: receiving a second command of the type from the application; and returning the returned execution result to the application.

According to one example embodiment of the present disclosure, adjusting the first command comprises: in response to determining that the type of the first command is handler-create type, returning to the application a virtual handler created on the basis of the first command; and notifying the host to create a real handler on the basis of the first command and to map the virtual handler to the real handler.

According to one example embodiment of the present disclosure, the acts further comprise: receiving a second command to operate the virtual handler from the application; and notifying the host to operate the real handler on the basis of the second command.

According to one example embodiment of the present disclosure, the acts further comprise: receiving an execution result of operating the real handler by the host; and returning the execution result to the application so as to respond to the second command.

According to one example embodiment of the present disclosure, the acts further comprise: in response to determining that the type of the first command is data-copy type, executing the first command, the first command indicating that target data at a source address in a source device is to be copied to a first destination address in a destination device; receiving a second data-copy type command, the second command indicating that the target data is to be copied to a second destination address in the destination device; and adjusting the second command on the basis of a comparison between data at the first destination address and the target data.

According to one example embodiment of the present disclosure, adjusting the second command on the basis of a comparison between data at the first destination address and the target data comprises: determining whether the data at the first destination address is changed after the execution of the first command; in response to determining that data at the first destination address is not changed after the execution of the first command, executing a third command, the third command indicating that the data at the first destination address in the target device is to be copied to the second destination address in the destination device.

According to one example embodiment of the present disclosure, the source device is the computing node, and the destination device is the client, wherein the acts further comprise: determining a first signature of data at the first destination address after the execution of the first command; wherein determining whether data at the first destination address is changed after the execution of the first command comprises: determining a target signature of the target data;

in response to the first signature matching with the target signature, determining that data at the first destination address is not changed after the execution of the first command; and in response to the first signature not matching with the target signature, determining that data at the first destination address is changed after the execution of the first command.

According to one example embodiment of the present disclosure, the source device is the client, and the destination device is the computing node, wherein determining whether data at the first destination address is changed after the execution of the first command comprises: in response to determining that a data-copy type command overlapping the first destination address is not received, determining that data at the first destination address is not changed after the execution of the first command.

According to one example embodiment of the present disclosure, there is provided a computer program product. The computer program product is tangibly stored on a computer readable medium and comprises machine executable instructions which, when executed, cause a machine to implement the method according to the present disclosure.

According to one example embodiment of the present disclosure, there is provided a computer readable medium. The computer readable medium is stored with machine executable instructions thereon, the machine executable instructions, when executed by at least one processor, causing the at least one processor to implement the method according to the present disclosure.

The present disclosure can be method, device, system and/or computer program product. The computer program product can comprise a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) comprise: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can comprise copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, micro codes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, comprising local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, comprising instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple embodiments of the present disclosure. In this regard, each block in the flow chart or block diagram can represent a module, a part of program segment or code, wherein the module and the part of program segment or code comprise one or more executable instructions for performing stipulated logic functions. In some alternative embodiments, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable other ordinary skilled in the art to understand embodiments of the present disclosure.

What is claimed is:

1. A method, comprising:
receiving, from an application at a client, a first command requesting to use a computing node associated with a host in a distributed system comprising multiple hosts;
determining a type of the first command; and
responsive to determining the type of the first command, adjusting the first command on the basis of the type of the first command to adapt an execution of the first command in the distributed system;
wherein, in response to determining that the type of the first command indicates an execution result of the first command will not change during execution of the application:
sending the first command to the host
receiving an execution result of the first command from the host and
returning the execution result to the application and storing the execution result;
wherein the computing node is a graphics processing unit, and the first command is a remote procedure call of the graphics processing unit.

2. The method of claim 1 further comprising:
receiving a second command of the type from the application; and
returning the returned execution result to the application.

3. The method of claim 1, wherein adjusting the first command comprises:
in response to determining that the type of the first command is a handler-create type, returning to the application a virtual handler created on the basis of the first command; and
notifying the host to create a real handler on the basis of the first command and to map the virtual handler to the real handler.

4. The method of claim 3, further comprising:
receiving a second command to operate the virtual handler from the application; and
notifying the host to operate the real handler on the basis of the second command.

5. The method of claim 4, further comprising:
receiving an execution result of operating the real handler by the host; and
returning the execution result to the application so as to respond to the second command.

6. The method of claim 1, further comprising:
in response to determining that the type of the first command is a data-copy type, executing the first command, the first command indicating that target data at a source address in a source device is to be copied to a first destination address in a destination device;
receiving a second data-copy type command, the second command indicating that the target data is to be copied to a second destination address in the destination device; and
adjusting the second command on the basis of a comparison between data at the first destination address and the target data.

7. The method of claim 6, wherein adjusting the second command on the basis of a comparison between data at the first destination address and the target data comprises:
determining whether the data at the first destination address is changed after the execution of the first command; and
in response to determining that data at the first destination address is not changed after the execution of the first command, executing a third command, the third command indicating that the data at the first destination address in the target device is to be copied to the second destination address in the destination device.

8. The method of claim 7, wherein the source device is the computing node, and the destination device is the client, wherein the method further comprises:
determining a first signature of data at the first destination address after the execution of the first command;
wherein determining whether data at the first destination address is changed after the execution of the first command comprises:
determining a target signature of the target data;
in response to the first signature matching with the target signature, determining that data at the first destination address is not changed after the execution of the first command; and
in response to the first signature not matching with the target signature, determining that data at the first destination address is changed after the execution of the first command.

9. The method of claim 7, wherein the source device is the client, and the destination device is the computing node, wherein determining whether data at the first destination address is changed after the execution of the first command comprises:
in response to determining that a data-copy type command overlapping the first destination address is not received, determining that data at the first destination address is not changed after the execution of the first command.

10. An apparatus, comprising:
at least one processor; and
a memory coupled to the at least one processor and having instructions stored thereon, the instructions, when executed by the at least one processor, causing the apparatus to perform acts comprising:

receiving, from an application at a client, a first command requesting to use a computing node associated with a host in a distributed system comprising multiple hosts;

determining a type of the first command; and responsive to determining the type of the first command, adjusting the first command on the basis of the type of the first command to adapt an execution of the first command in the distributed system;

wherein, in response to determining that the type of the first command indicates an execution result of the first command will not change during execution of the application:

sending the first command to the host;

receiving an execution result of the first command from the host; and returning the execution result to the application and storing the execution result;

wherein the computing node is a graphics processing unit, and the first command is a remote procedure call of the graphics processing unit.

11. The apparatus of claim 10, wherein the acts further comprise:

receiving a second command of the type from the application; and returning the returned execution result to the application.

12. The apparatus of claim 10, wherein adjusting the first command comprises:

in response to determining that the type of the first command is a handler-create type, returning to the application a virtual handler created on the basis of the first command; and notifying the host to create a real handler on the basis of the first command and to map the virtual handler to the real handler.

13. The apparatus of claim 12, wherein the acts further comprise:

receiving a second command to operate the virtual handler from the application;

notifying the host to operate the real handler on the basis of the second command;

receiving an execution result of operating the real handler by the host; and returning the execution result to the application so as to respond to the second command.

14. The apparatus of claim 10, wherein the acts further comprise:

in response to determining that the type of the first command is a data-copy type, executing the first command, the first command indicating that target data at a source address in a source device is to be copied to a first destination address in a destination device;

receiving a second data-copy type command, the second command indicating that the target data is to be copied to a second destination address in the destination device; and adjusting the second command on the basis of a comparison between data at the first destination address and the target data.

15. The apparatus of claim 14, wherein adjusting the second command on the basis of a comparison between data at the first destination address and the target data comprises:

determining whether the data at the first destination address is changed after the execution of the first command; and in response to determining that data at the first destination address is not changed after the execution of the first command, executing a third command, the third command indicating that the data at the first destination address in the target device is to be copied to the second destination address in the destination device.

16. The apparatus of claim 15, wherein the source device is the computing node, and the destination device is the client, wherein the acts further comprise: determining a first signature of data at the first destination address after the execution of the first command;

wherein determining whether data at the first destination address is changed after the execution of the first command comprises:

determining a target signature of the target data;

in response to the first signature matching with the target signature, determining that data at the first destination address is not changed after the execution of the first command; and in response to the first signature not matching with the target signature, determining that data at the first destination address is changed after the execution of the first command.

17. The apparatus of claim 15, wherein the source device is the client, and the destination device is the computing node, wherein determining whether data at the first destination address is changed after the execution of the first command comprises:

in response to determining that a data-copy type command overlapping the first destination address is not received, determining that data at the first destination address is not changed after the execution of the first command.

18. A computer program product, tangibly stored on a computer readable medium and comprising machine executable instructions which, when executed, cause a machine to implement a method comprising:

receiving, from an application at a client, a first command requesting to use a computing node associated with a host in a distributed system comprising multiple hosts;

determining a type of the first command; and responsive to determining the type of the first command, adjusting the first command on the basis of the type of the first command to adapt an execution of the first command in the distributed system;

wherein, in response to determining that the type of the first command indicates an execution result of the first command will not change during execution of the application:

sending the first command to the host;

receiving an execution result of the first command from the host; and returning the execution result to the application and storing the execution result;

wherein the computing node is a graphics processing unit, and the first command is a remote procedure call of the graphics processing unit.

19. The computer program product of claim 18, wherein the method further comprise:

receiving a second command of the type from the application; and returning the returned execution result to the application.

20. The computer program product of claim 18, wherein adjusting the first command comprises:
- in response to determining that the type of the first command is a handler-create type, returning to the application a virtual handler created on the basis of the first command; and
- notifying the host to create a real handler on the basis of the first command and to map the virtual handler to the real handler.

* * * * *

UNITED STATES PATENT AND TRADEMARK OFFICE
CERTIFICATE OF CORRECTION

PATENT NO. : 11,048,555 B2  
APPLICATION NO. : 16/384353  
DATED : June 29, 2021  
INVENTOR(S) : Wei Cui et al.

Page 1 of 1

It is certified that error appears in the above-identified patent and that said Letters Patent is hereby corrected as shown below:

In the Claims

Claim 1, Column 15, Line 47 delete "host" and insert therefor --host;--

Claim 1, Column 15, Line 49 delete "the host and" and insert therefor --the host; and--

Claim 19, Column 18, Line 64 delete "the method further comprise" and insert --the method further comprises--

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*